United States Patent [19]

Chang et al.

[11] 3,962,521
[45] June 8, 1976

[54] POLY(ETHER-URETHANE) COATING CURED WITH AN AMINOPLAST ON A SOLID SUBSTRATE

[75] Inventors: Wen-Hsuan Chang, Gibsonia; Hartman, Pittsburgh, both of Pa.

[73] Assignee: PPG Industries, Inc., Pittsburgh, Pa.

[22] Filed: May 14, 1975

[21] Appl. No.: 577,382

Related U.S. Application Data

[60] Continuation of Ser. No. 249,198, May 1, 1972, abandoned, which is a division of Ser. No. 839,648, July 7, 1969, abandoned.

[52] U.S. Cl.............................. 428/423; 260/849; 260/850; 428/310; 428/436; 428/460; 428/479; 428/425; 428/457
[51] Int. Cl.²......................................... C08L 68/20
[58] Field of Search............ 428/423, 425; 260/850, 260/849, 42.29, 75 NK, 77.5 AM

[56] References Cited
UNITED STATES PATENTS

| | | | |
|---|---|---|---|
| 2,625,535 | 1/1953 | Mastin et al. | 260/75 NK |
| 2,850,474 | 9/1958 | Maxey | 260/850 |
| 3,148,173 | 9/1964 | Axelrood | 250/850 |
| 3,368,988 | 3/1966 | Habib | 260/849 |
| 3,542,718 | 11/1970 | Davis et al. | 260/849 |

*Primary Examiner*—William J. Van Balen
*Assistant Examiner*—R. J. Roche
*Attorney, Agent, or Firm*—Frank J. Troy; William J. Uhl

[57] ABSTRACT

Cured coatings having a high degree of extensibility and other desirable properties are obtained from compositions comprising a hydroxyl-containing, urethane reaction product containing a polyether component and an amine-aldehyde resin. Preferred compositions contain a polyether polyol of low glass transition temperature. These compositions are storage-stable in one package, and the cured coatings are adherent, durable and highly extensible. These coatings are particularly useful on resilient and rubbery substrates, such as foam rubber, polyurethane foam and vinyl foam, and on soft metal surfaces such as mild steel and aluminum.

12 Claims, No Drawings

POLY(ETHER-URETHANE) COATING CURED WITH AN AMINOPLAST ON A SOLID SUBSTRATE

CROSS-REFERENCE TO RELATED APPLICATIONS

This application is a continuation of application Ser. No. 249,198 filed May 1, 1972, now abandoned which in turn is a division of application Ser. No. 839,648, filed July 7, 1969, now abandoned, refiled Oct. 29, 1973 as application Ser. No. 410,660 which is now U.S. Pat. No. 3,912,790.

BACKGROUND OF THE INVENTION

Recent advances in coating technology have provided coatings which are suitable for use over various substrates which are difficult to coat and having many different properties. Coatings of excellent appearance, a higher order of durability and having the ability to withstand severe environmental conditions have been obtained. Among the more advanced coatings are those employed in vehicles, such as automobiles, where good appearance must be maintained over long periods despite exposure to weather and various forms of attack during use.

Recently, there has been interest in the use of rubbery resilient materials for areas which are subject to mechanical shock, such as automobile bumpers and moldings, exposed corners and surfaces of industrial machines, kickplates and other areas of doors and entrances, armrests and other padded surfaces, and the like. The use of such materials aids in providing protection against permanent structural damage, but in order to attain the desired appearance a decorative and protective coating must be applied to the surface and this coating can also be damaged during use. Conventional coatings, including those employed on rubber and similar extensible objects heretofore, do not have the required combination of properties. These necessary properties include:

1. Extensibility - This property is necessary in order that the advantages of the resilient substrate can be utilized without destruction of the integrity of the surface of the coating.
2. Tensile Strength - A high degree of tensile strength is also necessary in order to avoid rupture of the film during use.
3. Package Stability - In order to permit ease of application, the liquid coating composition should be stable for extended periods under ambient conditions without either gelation or depolymerization of the resin contained therein.
4. Film Stability - Certain coatings which are extensible and which have a relatively high tensile strength lose those properties upon aging and particularly if the coating is exposed to sunlight, weathering, etc.
5. Impact resistance - The coating should have adaquate impact resistance at various temperatures as encountered in extreme weather variations, including temperatures as low as −20°F. and as high as 120°F.
6. Adhesion - The coating should have satisfactory adhesion to the various substrates with which it is to be employed including extensible materials such as foams, rubber and the like, and metals such as mild steel. In addition, the coatings should have satisfactory intercoat adhesion with succeeding coats or with various primers which can be employed.
7. Chemical and Humidity Resistance - This includes properties such as saponification resistance upon exposure to acids and alkalis, resistance to various solvents and resistance to atmospheres of high humidity and heat.
8. Resistance to Cracking under Temperature-Humidity Cycling - This property is important where the coating might be exposed to rapid variations in temperature and humidity as might be encountered by automobiles during travel or storage. This property is tested by successively exposing the coated object to conditions of high temperature and high humidity alternated with exposure to low temperature and low humidity.

Still other properties which are important for commercial applicability include sprayability at reasonable solids contents, non-toxicity, and low sensitivity to exposure.

It is especially difficult to obtain the above properties in combination since, in most instances, the obtention of one or several of the properties-desired requires the use of materials and formulations which under ordinary circumstances tend to make the other desired properties less satisfactory.

SUMMARY OF THE INVENTION

The compositions of the present invention comprise (1) an ungelled, hydroxyl-containing urethane reaction product of an organic polyisocyanate and a polyhydric material comprising a major proportion of polyether polyol, and (2) an amine-aldehyde resin. The polyether polyol has a hydroxyl equivalent of at least about 100, and usually between about 100 and about 10,000. (By "hydroxyl equivalent" is meant the weight per hydroxyl group). To obtain the desired extensibility and other properties, the polyether polyol should contain a total of not more than about one gram-mole of compounds having a functionality of 3 or more per 500 grams of the total of the components from which it is produced.

Such coatings can be applied to virtually any solid substrate and are especially useful on rubbery, resilient substrates such as polyurethanes or polyethylene foam, natural or synthetic rubber or rubber foam, and various elastomeric plastic materials. They are also particularly useful on other substrates such as mild steel or aluminum.

These compositions, although based on a urethane system, are distinguished from ordinary polyurethanes because they are both storage-stable in one package and yet form a crosslinked thermoset cured coating.

The coatings herein provide the above-mentioned properties to a satisfactory degree and have a combination of these properties which is not obtainable with conventional coating systems.

DETAILED DESCRIPTION OF THE INVENTION

The compositions of the invention contain as one component an isocyanate-modified resin containing hydroxyl groups and formed by reacting a polyhydric material comprising a polyether polyol with an organic polyisocyanate. The isocyanate-modified resin is combined with an aminoplast resin to provide the coating composition of the invention.

It is necessaty that the polyether polyol employed have certain properties in order to provide a coating of the desired characteristics. These properties are obtained in general by utilizing a polyether polyol (or mixture of polyols) having relatively long chains per hydroxyl group, and which thus has a hydroxyl equivalent of at least about 100 and preferably at least about 300. The polyether polyol component in most cases consists essentially of one or more diols; triols or higher polyols can also be used in whole or in part, provided the polyol component does not contain more than about one gram-mole of compounds having 3 or more hydroxyl groups per 500 grams of the total weight. While it is not always necessary to have a triol or higher polyol present, some branching is desirable, although the polyether should not be highly branched. There may also be present a small amount of monoalcohol, particularly if larger proportions of higher polyols are used. In certain instances, such as where very high molecular weight polyether polyols are used, the polyols can be largely or even entirely made up of compounds of functionality higher than two.

Among the preferred polyether polyols are poly(oxyalkylene)glycols such as those of the formula:

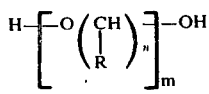

where R is hydrogen or lower alkyl and $n$ is typically from 2 to 6 and m is from 2 to 100 or even higher. Included are poly(oxytetramethylene)glycols, poly(oxyethylene)glycols, poly(oxytrimethylene)glycols, poly-(oxypentamethylene) - glycols, polypropylene glycols, etc. The preferred polyether polyols of this class are poly(oxytetramethylene)glycols of molecular weight between about 400 and about 10,000.

Also useful are polyether polyols formed from the oxyalkylation of various polyols, for example, glycols, such as ethylene glycol, 1,6-hexanediol, and the like, or higher polyols, such as trimethylolpropane, trimethylolethane, pentaerythritol, and the like. Polyols of higher functionality which can be utilized as indicated can be made, for instance, by oxyalkylation of compounds as sorbitol or sucrose. One commonly utilized oxyalkylation method is by reacting a polyol with an alkylene oxide, e.g., ethylene or propylene oxide, in the presence of an acidic or basic catalyst.

Mixtures of polyether polyols, or polyols containing moieties of different structures are also useful.

As mentioned, the overall functionality per unit weight of the polyether polyol is important. The polyether polyol should not contain (i.e., be formed from) more than about one gram-mole of compounds having a functionality of 3 or more, per 500 grams of the total weight of polyether polyol. By "functionality" is meant the number of reactive hydroxyl (and any carboxyl) groups per molecule. It can be noted that certain compounds contain both hydroxyl and carboxyl groups; examples are 6-hydroxyhexanoic acid, 8-hydroxyoctanoic acid, tartaric acid, etc.

In addition to the methods indicated, the polyether polyol can be produced by any of the several known techniques, with the reaction conditions and the ratio of reactants chosen so as to provide a product having residual hydroxyl groups, i.e., a polyether polyol having a hydroxyl equivalent of at least 100 and preferably not above about 10,000.

The polyether polyol as described provides the major proportion of the polyhydric material and may be the entire polyhydric component utilized. However, in many instances, other hydroxyl-containing compounds are used, particularly polyester polyols of the various types known in the art; examples of such polyester polyols are described, for example, in our copending application Ser. No. 828,337, filed May 27, 1969, entitled "Extensible Coatings". Other hydroxyl-containing compounds include monomeric polyols, especially diols, such as 1,4-butanediol, neopentyl glycol, and the like; monohydric alcohols; and polyfunctional compounds containing one or more hydroxyls, such as ethanolamine. There can also be included compounds comprising other active hydrogen-containing groups, such as water and polyfunctional amines; examples include isophorone diamine, p-methane diamine, propylene diamine, hexamethylene diamine, diethylene triamine, triethylene tetramine, diethanolamine, etc.

The organic polyisocyanate which is reacted with the polyhydric material as described is essentially any polyisocyanate, e.g., hydrocarbon polyisocyanates or substituted hydrocarbon diisocyanates. Many such organic polyisocyanates are known in the art, including p-phenylene diisocyanate, biphenyl diisocyanate, toluene diisocyanate, 3,3'-dimethyl-4,4'-biphenylene diisocyanate, 1,4-tetramethylene diisocyanate, hexamethylene diisocyanate, 2,2,4-trimethyl-1,6-hexylene diisocyanate, methylene bis(phenyl isocyanate), lysine methyl ester diisocyanate, bis(isocyanatoethyl)fumarate, isophorone diisocyanate and methyl cyclohexyl diisocyanate. There can also be employed isocyanato-terminated adducts of diols, such as ethylene glycol, 1,4-butylene glycol, polyalkylene glycols, etc. These are formed by reacting more than one mole of a diisocyanate, such as those mentioned, with one mole of a diol to form a longer chain diisocyanate. Alternatively, the diol can be added along with the diisocyanate.

While diisocyanates are preferred, higher polyisocyanates can be utilized as part of the organic polyisocyanate. Examples are 1,2,4-benzene triisocyanate and polymethylene polyphenyl isocyanate.

It is preferred to employ an aliphatic diisocyanate since it has been found that these provide better color stability in the finished coating. Examples include bis-(isocyanatocyclohexyl)methane, 1,4-butylene diisocyanate and methylcyclohexyldiisocyanate. The proportions of the diisocyanate and the polyether polyol are chosen so as to provide a hydroxyl-containing product. This can be accomplished by utilizing a less than stoichiometric amount of polyisocyanate, i.e., less than one isocyanate group per hydroxyl and carboxyl group in the polyether. Higher (e.g., stoichiometric or excess) isocyanate levels can be present if the reaction is terminated at the desired stage, as by addition of a compound which reacts with the residual isocyanate groups; water, alcohols and amines are examples of such compounds.

In one especially desirable embodiment of the invention, a polyfunctional alcohol is used to terminate the reaction at the desired stage (determined by the viscosity), thereby also contributing residual hydroxyl groups. Particularly desirable for such purposes are aminoalcohols, such as ethanolamine, diethanolamine and the like, since the aminogroups preferentially react with the isocyanate groups present. Polyols, such as ethylene glycol, trimethylolpropane and hydroxyl-terminated polyesters or polyethers, can also be employed in this manner.

While the ratios of the components of the polyether polyol, the polyisocyanate and any terminating or blocking agent can be varied, it will be noted by those skilled in the art that the amounts should be chosen so as to avoid gelation and to produce an ungelled, urethane reaction product containing hydroxyl groups. The hydroxyl value of the urethane reaction product should be at least 10 and preferably 20 to about 200.

The urethane reaction product as described above is mixed with an aminoplast resin to provide the coating composition. Aminoplast resins are aldehyde condensation products of melamine, urea, and similar compounds; products obtained from the reaction of formaldehyde with melamine, urea or benzoguanamine are most common and are preferred herein. However, condensation products of other amines and amides can also be employed, for example, aldehyde condensates of triazines, diazines, triazoles, guanidines, guanamines, and alkyl and aryl substituted derivatives of such compounds, including alkyl and aryl substituted ureas and alkyl and aryl substituted melamines. Some examples of such compounds are N,N-dimethylurea, benzourea, dicyandiamide, formoguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 2,4,6-triethyl triamino-1,3,5-triazine, and the like.

While the aldehyde employed is most often formaldehyde, other similar condensation products can be made from other aldehydes, such as acetaldehyde, crotonaldehyde, acrolein, benzaldehyde, furfural, and others.

The amine-aldehyde condensation products contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as Cellosolves and Carbitols, and halogen-substituted or other substituted alcohols, such as 3-chloropropanol. The preferred amine-aldehyde resins are etherified with methanol or butanol. In some instances, the alkylol groups of the condensation product are reacted to form acyl groups, as by reaction with acetic anhydride, or are reacted with amines such as morpholine.

For optimum properties, it is preferred that the composition contain a polymeric polyol having a low glass transition temperature, i.e., having a glass transition temperature below about 25°C. The inclusion of such a polymeric polyol gives a balance of flexibility and hardness. In many cases the polyether polyol utilized has the desired glass transition temperature. When it is desired to add a component of this type, there can be used in addition to the polyether polyols described, any of the many polyester polyols having the desired glass transition temperature, especially those produced from acyclic reactants such as adipic acid and azelaic acid and alkylene glycols; poly(neopentyl adipate) is a useful example. Still other polymeric polyols of suitable properties include condensates of lactones with polyols, such as the product from caprolactone and ethylene glycol, propylene glycol, trimethylolpropane, etc.

Where the polyether polyol utilized is of low glass transition temperature, it is often found that the coating does not have suitable hardness. It is therefore desirable in many cases to employ the "soft" polyether polyol in conjunction with a minor proportion of a polyester polyol, or the constituents thereof, having a higher glass transition temperature. One method is to include polyester moieties in the polyether molecule; another way is to produce an isocyanato-terminated adduct or prepolymer from the polyester polyol and the polyisocyanate; a third method is to blend the polyester polyol as such with the polyether polyol before or after the polyester is reacted with the polyisocyanate. The addition of low molecular weight diols or diamines can also be employed. The choice of method depends upon the particular components used and the properties desired, but in each instance the product obtained contains both "hard" and "soft" segments in a type of block copolymer.

The proportions of the above components can be varied to provide certain properties. For example, higher levels of polyether polyol result in somewhat softer and more extensible coatings, whereas harder, more resistant coatings are obtained by increasing the proportion of aminoplast resin. The amounts employed depend in large part upon the nature of the particular components, e.g., the specific polyether polyol, aminoplast resin, as well as the type of polyester polyol, if any, employed. In most cases the overall composition contains from about 50 to about 95 percent by weight of urethane reaction product, and from about 5 to about 50 percent of aminoplast resin.

In addition to the components above, the compositions ordinarily contain other optional ingredients, including various pigments; any of the pigments ordinarily utilized in coatings of this general class can be used. In addition, various fillers, plasticizers, antioxidants, flow control agents, surfactants and other such formulating additives are employed in many instances. The composition is ordinarily contained in a solvent, which can be any solvent or solvent mixture in which the materials employed are compatible and soluble to the desired extent.

The compositions herein can be applied by any conventional method, including brushing, dipping, flow coating, etc., but they are most often applied by spraying. Usual spray techniques and equipment are utilized. They can be applied over virtually any substrate, including wood, metals, glass, cloth, plastics, foams, and the like, as well as over various primers.

The coatings are cured at elevated temperatures. In most cases the cure schedule is from about 20 to about 40 minutes at 140°F. to 260°F. Higher or lower temperatures with correspondingly shorter or longer times can be utilized, although the exact cure schedule best employed depends in part upon the nature of the substrate as well as the particular components of the composition. Acid catalysts and other curing catalysts can be added to aid in curing if desired; these can permit the use of lower temperatures and/or shorter times.

The invention will be further described in connection with several examples which follow. These examples are given as illustrative of the invention and are not to be construed as limiting it to their details. All parts and percentages in the examples and throughout the specification are by weight unless otherwise indicated.

EXAMPLE 1

The following are mixed in a reaction vessel:

| | Parts by Weight |
|---|---|
| Poly(oxytetramethylene)glycol (molecular weight 1000) | 1000 |
| Polyester polyol* | 574 |
| 1,4-Butanediol | 82.3 |
| 1,6-Hexanediol | 128.7 |
| Dimethylformamide | 892.5 |

*From neopentyl glycol-adipic acid, acid value 8.3; hydroxyl value 35.

This mixture is then employed in the following:

| | Parts by Weight |
|---|---|
| Mixture above | 1220 |
| Methane-bis(cyclohexyl isocyanate) (Hylene W) | 472 |
| Cyclohexanone | 325 |
| Dimethylformamide | 860 |
| Diethylenetriamine | 8.1 |
| Dibutyltin diacetate solution (1 percent in cyclohexanone) | 14.4 |

This mixture is heated at 250°F. for 2-½ hours; to 2717 parts of the resin produced there are added 272 parts of butanol and 10.7 parts of diethanolamine. The product has a non-volatile solids content of 40.5 percent and an acid value of 0.63.

The urethane reaction product obtained is formulated into a coating composition as shown:

| | Parts by Weight |
|---|---|
| Urethane reaction product | 632 |
| Pigment paste | 227 |
| Methylated melamine-formaldehyde resin ("OR-483") | 134 |
| Silica pigment (Arc Silica) | 8 |
| Methyl ethyl ketone | 1110 |
| Toluene | 123 |
| p-Toluene sulfonic acid | 4 |

The pigment paste employed is ground in a solution of a polyester made from 146 parts of neopentyl glycol, 112 parts of adipic acid, 191 parts of isophthalic acid and 103 parts of trimethylolpropane; the paste is produced by mixing the following:

| | Parts by Weight |
|---|---|
| Polyester (60 percent solids in xylene) | 89 |
| TiO$_2$ | 260 |
| Xylene | 28 |
| Methyl isobutyl ketone | 43.5 |
| Butanol | 10.5 |

This mixture is ground in a ball mill until the particles have a fineness of 6-½ Hegman and then 50 parts of toluene are added.

The coating composition thus obtained has good storage stability and excellent properties; when applied over poly(vinyl chloride) foam and baked at 250°F. for 30 minutes it provides a coating having good low temperature impact resistance (3 ft.-lbs. ats. - 20°F.), and tensile strength (2.5 × 10$^5$ g/cm$_2$, measured on Instron Tester).

EXAMPLE 2

Example 1 is repeated except that the aminoplast resin employed is hexakis(methoxymethyl)melamine ("Cymel 300"). Substantially similar properties are obtained.

EXAMPLE 3

Example 1 is repeated using as the aminoplast resin a butylated melamine-formaldehyde resin made using 5.5 moles of formaldehyde and 6 moles of butanol per mole of melamine. Good results are obtained.

EXAMPLE 4

Example 1 is repeated using a urethane reaction product formed from the following:

| | Parts by Weight |
|---|---|
| Poly(oxytetramethylene)glycol (molecular weight 1000) | 352 |
| 1,4-Butanediol | 34 |
| 1,6-Hexanediol | 45 |
| Polyester polyol (as in Example 1) | 202 |
| Methane-bis(cyclohexyl isocyanate) | 367 |

Substantially equivalent results to those of Example 1 are obtained.

EXAMPLE 5

A urethane reaction product, employed in a manner similar to the above examples, is produced as follows:

| | Parts by Weight |
|---|---|
| Poly(oxytetramethylene)glycol (molecular weight 1000) | 500 |
| 1,4-Butanediol | 105 |
| 1,6-Hexanediol | 150 |
| Trimethylolpropane | 30 |
| Methyl isobutyl ketone | 1835 |

The above mixture (1000 parts) is mixed with 292 parts of methane-bis(cyclohexyl isocyanate), 680 parts of methyl isobutyl ketone and 2 parts of a one percent solution of dibutyltin diacetate in methyl isobutyl ketone, and heated at 230°C. for 10 hours. There are then added 30 parts of butanol per hundred parts of resin.

EXAMPLE 6

A urethane reaction product is produced in a manner similar to that described in Example 5, from the following:

| | Parts by Weight |
|---|---|
| Poly(oxytetramethylene)glycol | 500 |
| Isophorone diamine | 10.5 |
| Diethanolamine | 3 |
| 1,4-Butanediol | 85 |
| Toluene diisocyanate* | 300 |

*80 percent, 2,4-isomer, 20 percent, 2,6-isomer

Employed in the manner of the above examples, coatings of suitable properties are obtained.

In a similar manner, coating compositions of desirable properties are produced using other polyether polyols of the class described, as well as other polyisocyanates in place of the polyethers and polyisocyanates in the examples. Also, while the examples show the inclusion of certain diols and polyester polyols, other polyols can be used instead; such polyols include, for instance, monomeric diols and triols and other polyester polyols.

According to the provisions of the patent statutes, there are described above the invention and what are now considered to be its best embodiments. However, within the scope of the appended claims, it is to be understood that the invention can be practiced otherwise than as specifically described.

We claim:

1. A coated article comprising a highly extensible cured coating composition on a solid substrate wherein said coating composition comprises:
   A. from 95 percent by weight to about 50 percent by weight, based on the combined weight of (A) and (B), of an ungelled, hydroxyl-containing urethane reaction product, having a hydroxyl value between about 10 and about 200, produced by the method comprising:
      1. reacting an organic polyisocyanate with an active hydrogen-containing material selected from the group consisting of polyester polyols, low molecular weight monomeric diols, and diamines, thereby forming an isocyanato-terminated adduct, and
      2. reacting said isocyanato-terminated adduct with polyether polyol, having an hydroxyl equivalent of at least about 100 and a glass transition temperature below about 25°C.,
   whereby said active hydrogen-containing material provides hard segments in said urethane reaction product and whereby said polyether polyol provides soft segments in said urethane reaction product; and whereby said urethane reaction product has a major proportion of said soft segments and a minor proportion of said hard segments; and
   B. about 5 percent to about 50 percent by weight, based on the combined weight of (A) and (B), of an aminoplast resin.

2. The article of claim 1 wherein said substrate is a polyurethane foam.

3. The article of claim 1 wherein said polyether polyol is a poly(oxyalkylene)glycol.

4. The article of claim 3 wherein said poly(oxyalkylene)glycol is poly(oxytetramethylene)glycol.

5. The article of claim 1 wherein said polyester polyol is the reaction product of adipic acid and neopentyl glycol.

6. The article of claim 1 wherein the ratio of isocyanate groups to reactive hydroxyl and carboxyl groups is less than 1 to 1.

7. The article of claim 1 wherein a polyfunctional alcohol is added to the product of the reaction between said organic polyisocyanate and said polyether polyol.

8. The article of claim 7 wherein said polyfunctional alcohol is an aminoalcohol.

9. A coated article comprising a highly extensible cured coating composition on solid substrate wherein said coating composition comprises:
   A. About 95 percent by weight to about 50 percent by weight, based on the combined weight of (A) and (B), of an ungelled, hydroxyl-containing urethane reaction product having a hydroxyl value between about 10 and about 200, produced by the method comprising:
      1. blending a polyether polyol having an hydroxyl equivalent of at least about 100 and a glass transition temperature below about 25°C. with an active hydrogen-containing material selected from the group consisting of polyester polyols, low molecular weight monomeric diols and diamines, and
      2. reacting the resultant blend with an organic polyisocyanate,
   whereby said active hydrogen-containing material provides hard segments in said urethane reaction product and whereby said polyether polyol provides soft segments in said urethane reaction product; and whereby said urethane reaction product has a major proportion of said soft segments and a minor proportion of said hard segments; and
   B. about 5 percent to about 50 percent by weight, based on the combined weight of (A) and (B), of an aminoplast resin.

10. The coated article of claim 9 wherein said polyether polyol is a poly(oxyalkylene)glycol.

11. A coated article comprising a highly extensible cured coating composition and a solid substrate wherein said coating composition comprises:
   A. about 95 percent by weight to about 50 percent by weight, based on the combined weight of (A) and (B) of an ungelled, hydroxyl-containing urethane reaction product of an organic isocyanate and a material comprising:
      1. a major proportion of polyether polyol having a hydroxyl equivalent of at least about 100 and a glass transition temperature below about 25°C., and
      2. a minor proportion of a component which provides hard segments in the urethane reaction product, said component being selected from the class consisting of polyester polyols, low molecular weight monomeric diols and diamines, and
   B. about 5 percent to about 50 percent by weight, based on the combined weight of (A) and (B) of an aminoplast resin.

12. The coated article of claim 11 wherein said polyether moieties are derived from a poly(oxyalkylene)glycol.

* * * * *